Nov. 28, 1961  W. J. WAWRZONEK ET AL  3,010,556
REFRIGERATED FOOD VENDER

Filed Sept. 28, 1954  4 Sheets-Sheet 1

INVENTORS
WILLIAM J. WAWRZONEK
WILLIAM A. BENZ
BY
Miles Henninger
ATTORNEY

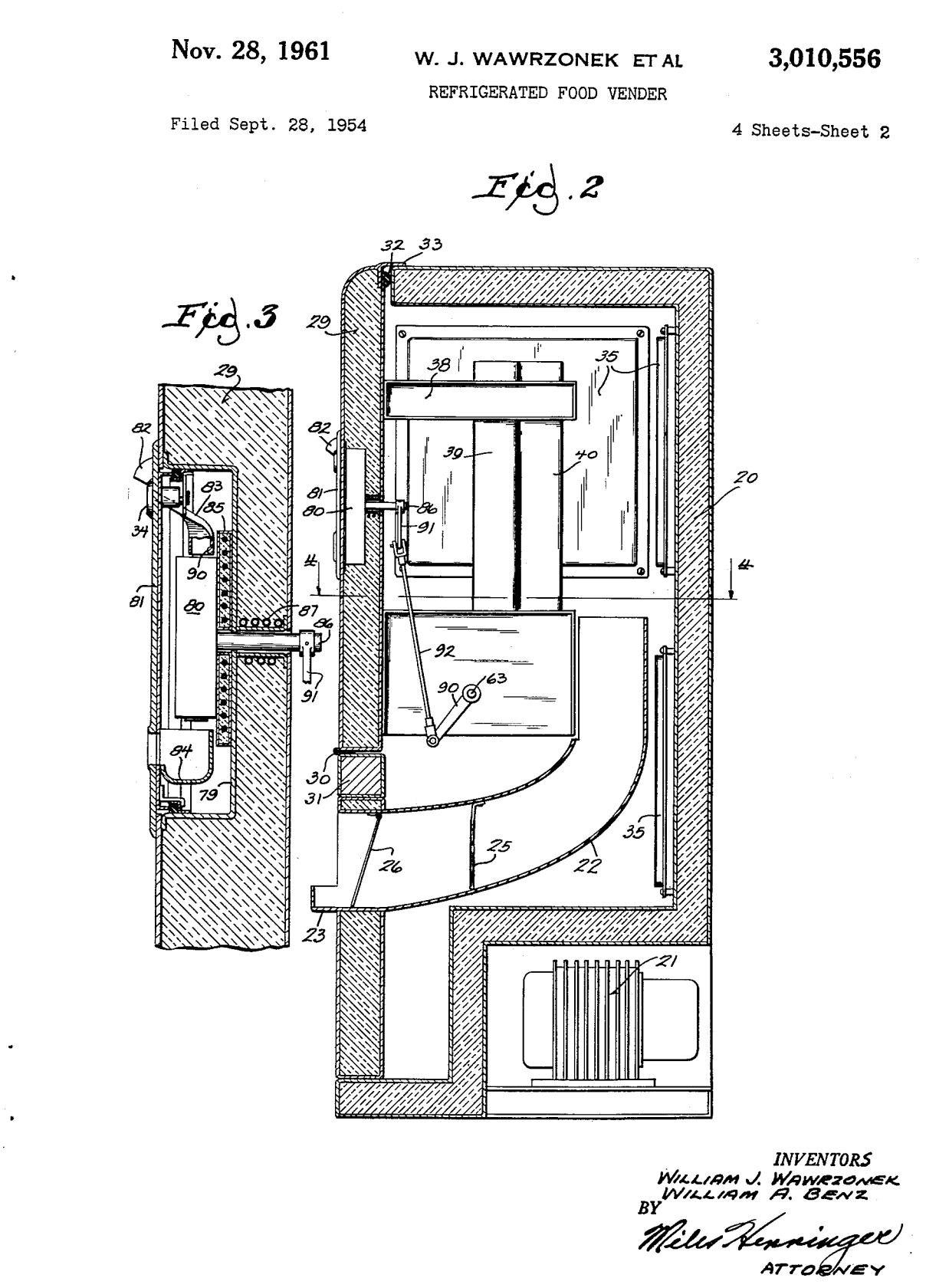

Nov. 28, 1961     W. J. WAWRZONEK ET AL     3,010,556
REFRIGERATED FOOD VENDER

Filed Sept. 28, 1954     4 Sheets-Sheet 2

INVENTORS
WILLIAM J. WAWRZONEK
WILLIAM A. BENZ
BY
ATTORNEY

Nov. 28, 1961   W. J. WAWRZONEK ET AL   3,010,556
REFRIGERATED FOOD VENDER
Filed Sept. 28, 1954   4 Sheets-Sheet 3
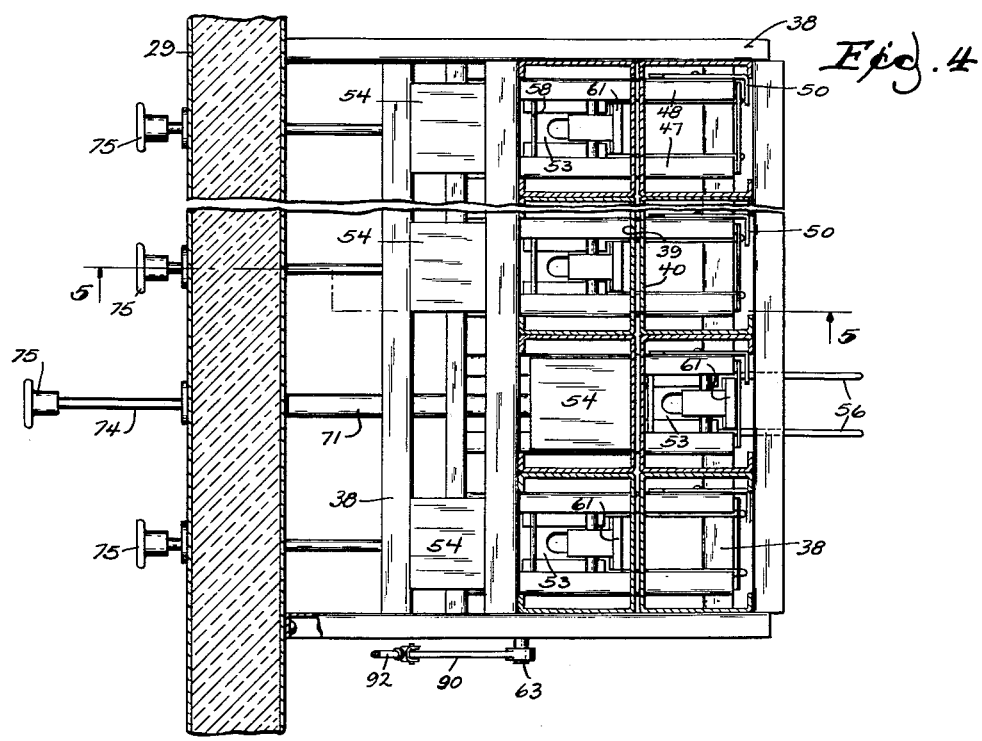
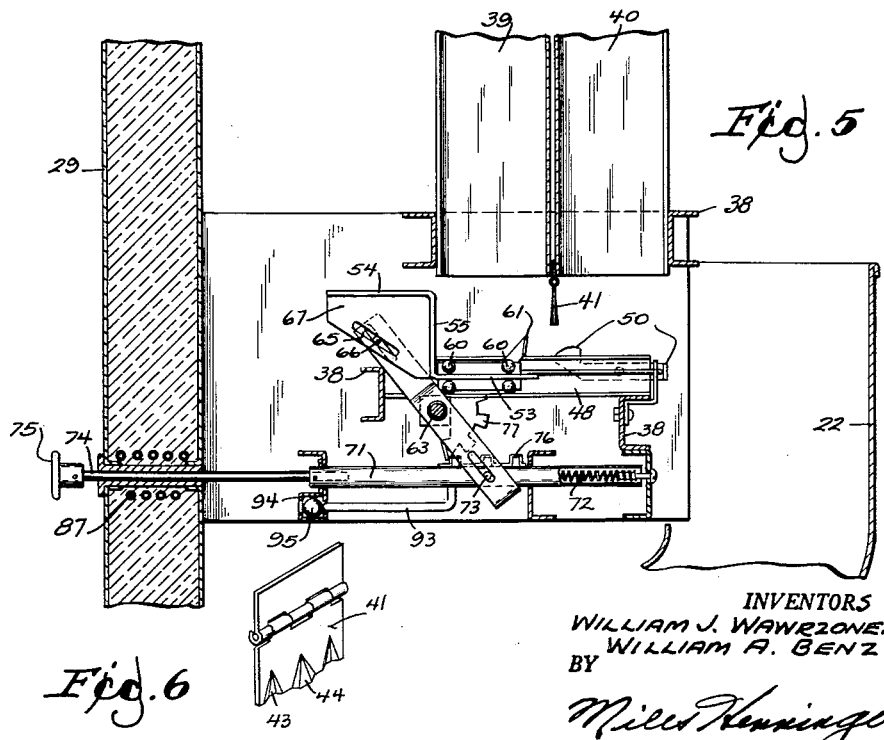
INVENTORS
WILLIAM J. WAWRZONEK
WILLIAM A. BENZ
BY
Miles Henninger
ATTORNEY Nov. 28, 1961   W. J. WAWRZONEK ET AL   3,010,556
REFRIGERATED FOOD VENDER
Filed Sept. 28, 1954   4 Sheets-Sheet 4
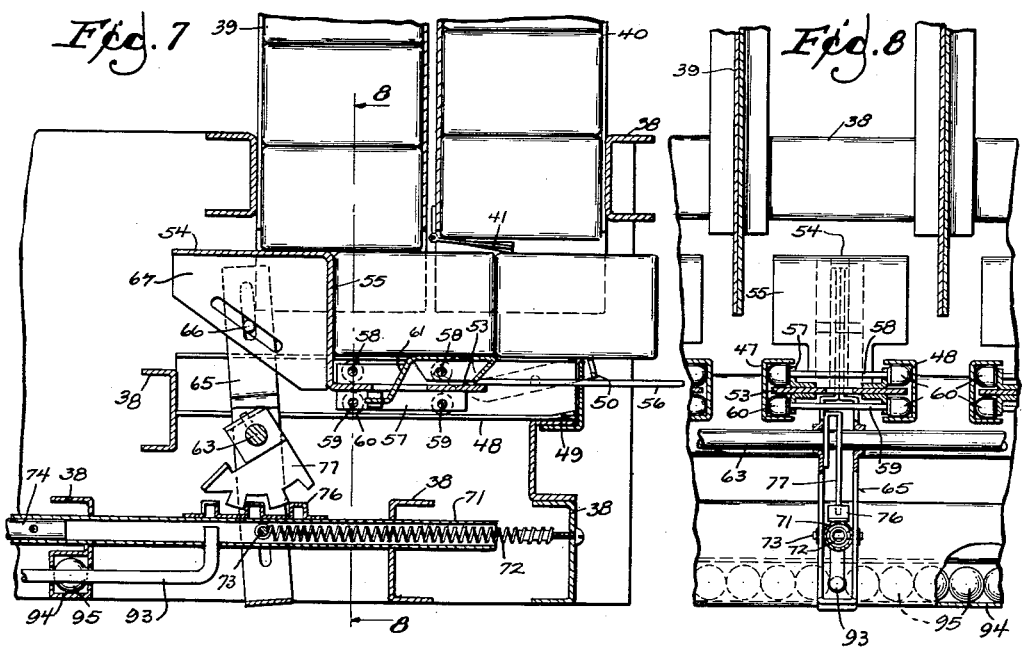
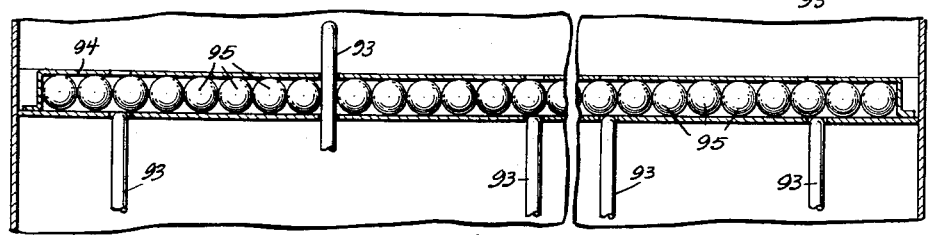
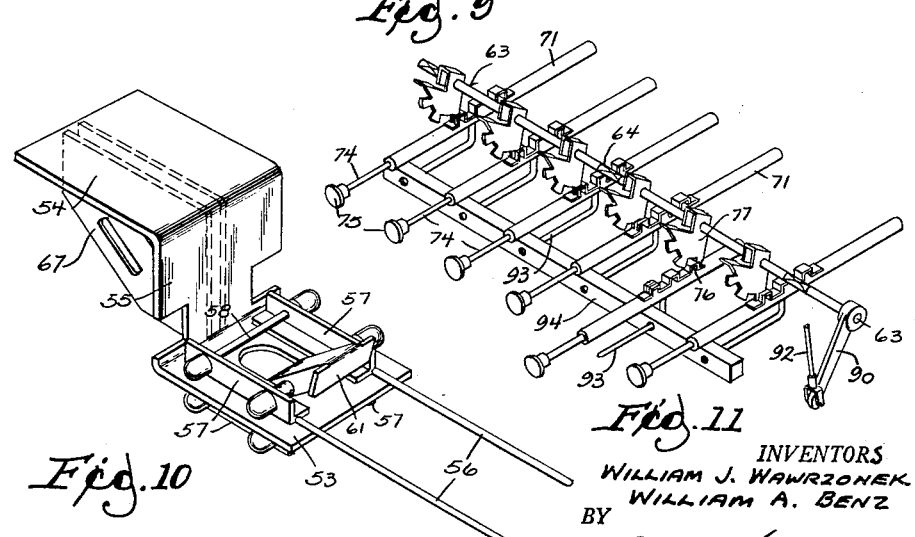
INVENTORS
WILLIAM J. WAWRZONEK
WILLIAM A. BENZ
BY
ATTORNEY

United States Patent Office 3,010,556
Patented Nov. 28, 1961

3,010,556
REFRIGERATED FOOD VENDER
William J. Wawrzonek, 9422 W. Burleigh St., and William A. Benz, 727 W. Locust St., both of Milwaukee, Wis.
Filed Sept. 28, 1954, Ser. No. 458,788
3 Claims. (Cl. 194—2)

This invention relates to improvements in dispensing or vending machines of the coin-controlled type and particularly to machines for dispensing packaged frozen foods upon release of the dispensing mechanism by the deposit of specified coins and the pulling of one of a number of rods.

Even though frozen foods have long been articles of ordinary commerce and most of the problems in handling and sales of such foods are solved in a practical manner, no one has heretofore produced a commercially operable machine for the self-service vending of packaged foods which should be kept frozen and which is operable by a purchaser of food after deposit of specified coins. A practical frozen foods vending machine of the coin-controlled type must avoid or solve many problems which are not present when the food is refrigerated but not frozen and when the sale of frozen foods is under the supervision of a vendor as is the case, e.g. with the self-service frozen foods display cases in a store. Some of such requirements relate to the machine itself. Other requirements stem from the fact that vending machines are economically practical only if they can be accessible to the public at all times with little or no supervision. And further requirements are due to desire for a machine usable either indoors or outdoors and with or without protection from weather.

For frozen foods, low temperature refrigeration (—20 to —10°) must be provided in such manner as to minimize "frosting" and to avoid freezing together of the food packages and the dispensing mechanism and control parts. To minimize the moisture entering a cabinet and to reduce machine servicing to a practical number of trips, a sufficient number of food package racks must be provided to minimize the number of times a cabinet need be opened to maintain an adequate food supply. The dispensing mechanism must always deliver a package of the selected food, so long as the supply thereof is maintained and even though the packages are frozen together or to the dispensing mechanism, and even though considerable frost collects on the mechanism itself. The dispensing mechanism must operate faultlessly regardless of the condition of the packages when placed in the machine, such as softness due to insufficient refrigeration during transportation, or the manner in which the packages are placed in the machine.

To make the machine accessible to the public at all times, the machine must select and retain specified coins and must reject and return all other coins under any conditions of operation. The control mechanism must prevent operation of the dispensing mechanism unless and until deposit of the specified coin or coins. When a particular supply of food is exhausted, coins must be returned even though the purchaser has attempted to operate the mechanism of the empty rack. Once operation of part of the mechanism has been begun dependent on the food selected, a change of selection should be impossible to force operation of the mechanism as intended and its return to "ready" position. The coin selecting and rejecting mechanism should be protected from "frosting," rain and the like affecting its operation. Such mechanism should also be accessible without opening of the cabinet sufficiently for warming-up the cabinet space. The coin selector-rejector should be protected from tampering and theft.

Interlocks must also prevent discharge of more than one package per payment either from the same stack or from different stacks of packages. The machine should be generally non-susceptible to mischievous tampering therewith, and other problems of like nature must be solved to allow public access to the machine without supervision.

The machine should be usable out-of-doors with no protection whatever. Hence, all the mechanical sub-assemblies should be protected from interference therewith by air-borne grit, rain, snow, etc. All exterior cabinet joints should be sealed against penetration by dust or rain while allowing contraction and expansion thereof due to temperature differences, especially when a machine is fully exposed to all weather conditions. All doors should have inter-engaging surfaces and gaskets to prevent entry of grit and moisture into the cabinet and to seal the cabinet against air leakage into the cabinet in any amount of consequence. Door flanges should have drainage for moisture from all joints of the doors with the cabinet. Gaskets should be protected from direct sunlight and should be substantially inaccessible from exteriorly of the cabinet.

For convenience in maintenance and servicing of the vender, only the refrigerating system should be attached to the cabinet itself. All other sub-assemblies or sub-units of moving parts should be mounted on a readily removable door or frame swinging out of the cabinet far enough for convenient replenishment of the food supply, inspection, minor servicing and the like. When maintenance work is required on moving parts, an entire door or frame and the mechanism mounted thereon should be replaceable as a unit for return of only the replaced unit for repair. The food storage and vending mechanism should be purely mechanical and capable of operation easily even if allowed to accumulate a large amount of "frost." Even the chute for delivering a package, should be "air-locked" to minimize loss of cold air and the resultant leakage of warm air into the cabinet. The delivery chute must also be shaped to guide and turn a package when necessary for its sliding to a delivery tray.

It is therefore an object of the present invention to provide a refrigerated cabinet and mechanism of the coin-controlled type whereby one package, and only one package, of frozen food may be delivered for each deposit of specified coins and with a minimum of effort by the user in operating the dispensing mechanism.

Another object of the invention is to provide a refrigerated cabinet and mechanism for storing and for dispensing frozen foods as selected by a consumer and in which a sufficient supply of food packages may be placed to meet the demands during a given time without replenishment of the supply and from which all packages of the entire supply of any given food may be dispensed.

Another object of the invention is to provide a coin-controlled vending machine for frozen foods in which the stacks of packages and dispensing mechanism are movable even though frozen together and which thereby avoids failure of the machine to deliver a package of a selected food so long as any package thereof is available in the machine.

Another object of the invention is to provide a coin-controlled vending machine for frozen foods in which the dispensing mechanism is entirely mechanical and can be made with clearances sufficient to compensate for accumulation of frost in the machine.

Another object of the invention is to provide a machine for vending frozen foods in which operation of the dispensing mechanism is not affected by the condition of the packages when placed in the machine and the packages cannot be improperly placed in the machine.

Another object of the invention is to provide a machine for vending frozen foods in which a plurality of sub-assemblies or sub-units of the dispensing mechanism are so interlocked as to prevent delivery of more than one package of food per release of the dispensing mechanism by a coin selecting-rejecting mechanism, or leaving of any part of the dispensing mechanism in inoperative position.

Another object of the invention is to provide a machine for vending frozen foods in which it is impossible to operate a dispensing unit which is empty and thereby fail to obtain a package of one of the foods for each deposit of coins which is retained by the machine, provided not all of the food is exhausted.

Another object of the invention is to provide a machine for vending frozen foods in which the machine may be used either indoors or outdoors without change and without substantially affecting the reliability of the machine.

A further object of the invention is to provide a dispensing machine in which the various sub-assemblies of the dispensing mechanism are a simplified mechanical combination to provide reliability in operation, to minimize maintenance and to permit servicing of the machine at times when convenient to the owner thereof.

Other advantages and objects than those above set forth will be apparent from the following description when read in connection with the accompanying drawings in which:

FIG. 2 is a vertical sectional view on the plane of line 2—2 of FIG. 1;

FIG. 3 is an enlarged cross-sectional view of a portion of the movable front wall section with the coin selector-rejector therein;

FIG. 4 is a horizontal section on the plane of line 4—4 of FIG. 2, of the cabinet movable front wall portion and dispensing mechanism;

FIG. 5 is a partial vertical section on the plane of line 5—5 of FIG. 4 of one dispensing unit;

FIG. 6 is a perspective view of a modified form of one of the parts shown in FIG. 5;

FIG. 7 is an enlarged view of the dispensing unit shown in FIG. 5, with some additional parts in cross-section and with packages of food in position for discharge from the vending machine;

FIG. 8 is a vertical section on the plane of line 8—8 of FIG. 7;

FIG. 9 is a horizontal sectional view of parts of an interlock or latch in the dispensing mechanism;

FIG. 10 is a perspective view of one truck of the dispensing mechanism;

FIG. 11 is a perspective view of a shaft controlled by a coin actuated mechanism and the parts coacting therewith in forming an interlock for the several pull rods.

Figure 1:
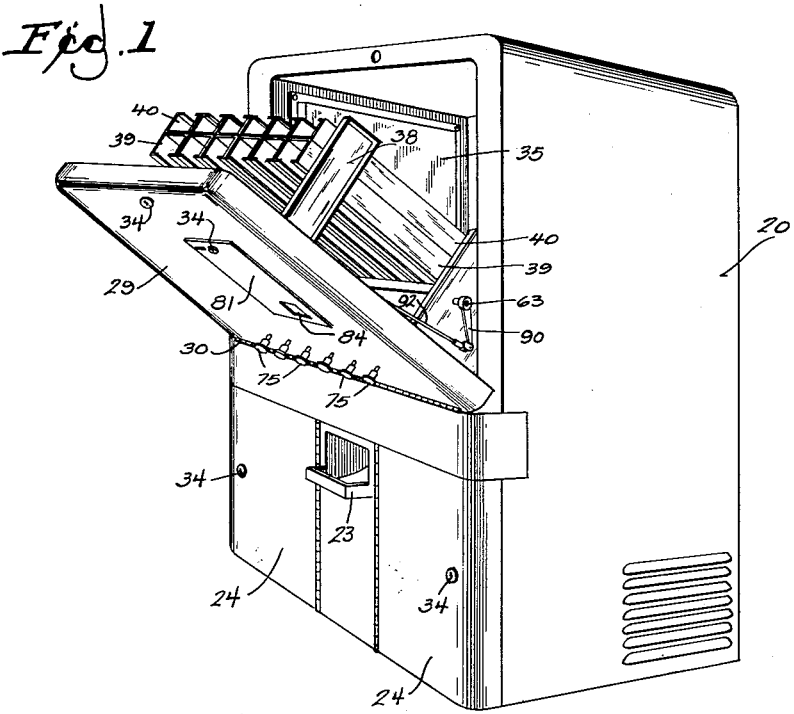
FIG. 1 is a perspective view of the present vending machine for coin-controlled dispensing of packaged frozen foods, with a portion of the front cabinet wall swung outward to illustrate the mounting of the dispensing mechanism on the door-like portion of the wall.

Generally, the present device comprises a substantially rectangular cabinet with heat-insulated walls providing a space receiving a number of heat exchangers of a compression type refrigeration system, and a mechanical dispensing mechanism for packaged frozen foods with one dispensing means per rack. A coin receiving mechanism controls dispensing of packages from the several racks, and space is provided for storage of a reserve of packaged foods. The cabinet also has an uninsulated cavity for receiving the compressor-condenser unit of the refrigerating system, such cavity being open for free circulation of air. The entire rack-dispensing and coin-receiving mechanisms are mounted on or in a cabinet front wall section hinged to the remainder of the cabinet for easy accessibility to the dispensing mechanism for loading or for maintenance thereof. However, the hinged front wall section may be used only as a door and the dispensing mechanism may be located on a hinged frame adjacent the door.

Generally, the dispensing mechanism comprises any desired number of dispensing sub-units each comprising a rack with two or more compartments to be filled with packages of frozen food and from which one package is to be delivered as selected by the user, and each time the dispensing mechanism is released from a latch and is operated by a user. A truck is mounted on tracks below each rack for delivery of the selected package of food to a discharge position. Upon deposit of the proper value in specified coins, a known coin selector-rejector mechanism permits movement of a truck upon pulling by the user on a rod from exteriorly of the cabinet for taking one package from a rack and discharge thereof into a delivery chute.

An interlock between dispensing sub-units prevents movement of more than one truck per deposit of coins and requires movement of the selected truck to discharge position. Each dispensing unit has a latch which prevents operation of its truck when its rack is empty and thus prevents retention of coins even though the user attempts to obtain a package of a food of which the supply is exhausted. The several latches and interlocks prevent movement of more than one truck at one time, require completion of the truck movement for delivery of one package of the selected food, re-latch all of the trucks against repeated movement until another deposit of coins has taken place, and prevent retention of coins after exhausting the supply of a desired food.

Referring to the drawing by reference numerals in which like numerals designate like parts, the numeral 20 generally designates the heat-insulated fixed wall portions of a cabinet. Such fixed cabinet wall portions comprise a frame on which is mounted a metallic outer shell with the joints of the shell parts joined and sealed against the entrance of dust and water but in such manner that the shell parts may expand and contract differentially without breaking the joints. Heat-insulation material is placed in the outer shell and covered by a liner of low heat conductivity and which is resistant to or impervious to moisture. No metallic portions extend between the interior and the exterior of the cabinet as paths for the flow of heat into the cabinet, as is usual refrigeration practice.

The insulated cabinet wall is re-entrant at the rear lower end to form a cavity for housing the usual compressor-condenser unit 21 of a compression type refrigerating system, the cavity being substantially closed by the louvered wall portion. Because of the compressing unit cavity, the corresponding lower front space in the cabinet is reduced in size from the upper cabinet space. A part of the lower front space is required for a delivery chute 22 (see FIG. 2) and tray 23, and the remaining space is available for storage of a reserve supply of food. Hence, the lower front side of the cabinet has two doors 24 for access to either side of the lower space. The delivery chute is capped and packages are actually delivered through the side of the chute, thus reducing the tendency of cold air to flow downward through the chute. The delivery chute has a flexible flap 25 extending across the chute and serving as a curtain through which packages slide and which will not block the chute in either direction. A rigid door 26 is hinged in the lower end of the chute to swing outward and act with the flap as an airlock to reduce loss of cold air from the cabinet.

A front wall portion 29 is horizontally hinged at 30 to a front wall frame member 31 for swinging outwardly and downwardly. The movable front wall portion 29 may be hinged to the cabinet by a known type of quick detachable hinge but is herein shown as having a piano-type hinge. The hinged front wall 29 and the doors 24 are provided with gaskets 32 for sealing to the fixed cabinet wall parts and are heat-insulated as well as the other portions of the cabinet walls. The doors also comprise a frame, an outer shell, insulation and a liner, and the outer shells are flanged as indicated at 33 (FIG. 2) to shield the gaskets 32 from sunlight and to avoid packing of snow and ice around the gaskets. The door flanges are all formed to drain to the outside of the cabinet any water penetrating below the flanges. The hinged front 29 and the storage doors 24 are provided with suitable locks 34 of well known construction.

The upper insulated space in the cabinet receives a number of heat exchangers 35 of a well known type, supplied with refrigerant under pressure from the refrigerating compressor-condenser unit. The tubular connections between the heat exchangers and the compressor-condenser unit, and the controls for the flow of refrigerant between the various portions of the refrigeration system, follow well known practice, are of well known construction and are not specifically described herein. The heat exchangers are spaced a considerable distance from the dispensing mechanism which tend to keep the dispensing mechanism free from frost as the moisture deposits on the heat exchangers even though there is little air circulation within the cabinet. The side of the outer cabinet is coated with a heat-reflective paint which aids in keeping the cabinet space at a uniform and low temperature even though the air circulation is minimized.

The dispensing mechanism is wholly mounted on the inner surface of the hinged cabinet front wall portion 29 and tends to pull the door closed to make it self-sealing. The dispensing mechanism comprises a frame of which all the various portions are designated 38. The frame has mounted in and on it a number of dispensing sub-units, each comprising a rack with two or more compartments 39, 40 aligned from front to rear of the cabinet and open at the top and bottom. Such compartments are shown as rectangular tubes but may be any shape provided they are the same shape and free from internal obstructions to the movement of the packages of frozen foods by gravity therethrough. The compartments are preferably somewhat larger than the cartons or cans of foods to be dispensed but are of a size to retain the food packages in such positions that they may move freely downwardly. The sides of the rack extend downwardly and along the sides of the tracks to center the package on the trucks and to prevent the package from slipping sideways of the tracks even though there might be icing or other conditions which might tend to cause such slippage. Any desired number of the dispensing units may be used, the present drawing being of the model now in use with six dispensing units which is a practical size for a pint size of packaged ice-cream.

A plate 41 is pivoted to and hangs downward between the two compartments 39, 40 of each rack, the pivoting being such that the plate may swing freely across the end of compartment 40 but cannot swing across compartment 39. The plate is preferably substantially the width of the compartment in one dimension and of approximately one-half the depth of the compartment in another dimension. Unless the plate is of the proper dimension, it will tend to imbed itself in soft packages and will increase the force required for operating the dispensing mechanism. The function of the plate is to serve as a movable partition in compartment 40 under some conditions, for holding one stack of packages therein and for allowing passage below the plate, of packages from the compartment 39 and to move out of its partitioning position under other conditions. Hence, the plate is called a "stack-separator" for definiteness in description. The plate may have plane surface or may be made as shown in FIG. 6 with a number of oppositely directed ribs 43, 44 to reduce the amount of surface in contact with the food packages and the possibility of freezing of the plate to the packages. The stack-separator must be free from projections which might catch on a package moving across either surface thereof.

A track is placed below each rack and comprises pairs of channel members 47, 48, set to define a rectangular space of uniform cross-section open for circulation of air therethrough. The track is spaced below the racks 39, 40 sufficiently to accommodate a truck for receiving food packages and conveying the packages to a discharge point. Portions of the track members may be bent upwardly or a separate member may be provided as indicated at 49 in FIG. 7, for partially closing the end of the tracks to limit movement of the trucks. The tracks extend to approximately the front end of the pairs of racks 39, 40 and are narrower than the racks. Being made from channels, the track provides both upper and lower flanges on each side which positively guide the truck and limit any tendency of the truck to tip upward. A lever 50 is bent at a right angle adjacent one end and is pivoted on a side of the track with the bent end extending across the track space. The bent end of the lever is heavier than the other end to swing the heavier end into the path of a part of the truck unless some weight rests on the other end of the lever. The lever 50 thus forms a latch preventing movement of an empty truck.

The several trucks are formed with a body element having a lower floor 53 and at least one upper horizontal floor 54 of a transverse size only slightly less than the track width, and at least one vertical portion 55 which is notched to receive the upper track channel side flanges. The truck floors are narrower than the racks and are each of a length about equal to the depth of one rack compartment so that each floor extends across substantially the entire cross-sectional area of one compartment of the rack, at different times. The end of each truck moving toward the rear wall of the cabinet has bars 56 extending therefrom to serve as an extension of truck floor 53. The truck floors provide large surface areas to eliminate possible deformation of soft packages of food into locking engagement with the floors but the bars carry only one package at a time and only for a short period of time.

Pairs of flanges are formed from or angle members 57 are fixed along the side edges and on both sides of the lower truck floor for severally receiving two pairs of axles 58, 59 having cap-like wheels 60 with rounded ends at each end of each axle, the rounded wheel ends being capable of bearing on the track webs. The axles and wheels are so spaced and the wheels are of such size as to bear on either upper or lower track surfaces as the truck moves to and fro dependent on the forces acting on the truck, but with little or no forward or backward tilting of the truck. The lower truck floor 53 has an aperture therein to receive a part of a member 61 pivoted on a truck axle and with a weighted end extending below the floor whereby such member may swing like a pawl to present a vertical surface toward the discharge end of the truck unless a package rests on the member. The function of such member is to serve as a pusher for packages taken from compartment 40 after compartment 39 is empty. The package-pusher must not interfere with the stack-holder, which limits one dimension of each of such parts. Where excessive frosting occurs, it is desirable to make both truck surface 55 and the "pushing" surface of pusher 61 with a sloped part tending to lift and break packages free before any considerable pushing of the package occurs.

Each truck has its own operating means for selective movement thereof toward the rear of the cabinet for discharge of a package and automatic return of the truck toward the front of the cabinet which is the position for reloading. A shaft 63 is supported at its ends on and extends between the ends of the dispensing mechanism frame and has a bearing 64 substantially midway its length to prevent bending of the shaft even though excessive force is applied transversely thereof. The shaft provides a pivot for one connector lever 65 per truck, the connector having different length arms from its pivot. Each one of the arms of the connector lever 65 is slotted from adjacent the end and the slot in the longer arm receives a pin 66 extending through a slot in a bracket 67 on the truck below the upper floor 54 thereof. The slots in the longer connector arm and in the bracket coact to move the truck along the track without a lifting action. The shorter connector lever arm slot receives a pin on a pull rod sub-assembly which is mounted in the frame to reciprocate therein.

Apertures through the door are provided with sleeves 70 of an elastic and low heat conductive material. The sleeves have an internal diameter such as to maintain a snug sliding fit with the outwardly extending portions of the pull rod assembly, which portions are also of low heat conductive material. Hence, there is little tendency for air leakage about the pull rods or collection of moisture on either the sleeves or the pull rod.

The pull rod sub-assembly includes a tube 71 slidable in the frame and extending longitudinally of the truck approximately midway of its width and substantially parallel thereto. The tube partly encloses a helical tension spring 72 fixed at one end on the frame and attached at the other end inside the tube to a pin 73. A pull rod 74 is fastened in the tube and is otherwise supported in the frame for movement to and fro. The pull rod extends through the cabinet front wall below the hinged wall section 29 and has a knob 75 exteriorly of the cabinet. The pin 73 extends from the pull rod and into the slot in the shorter arm of the connector lever 65.

Figure 12:
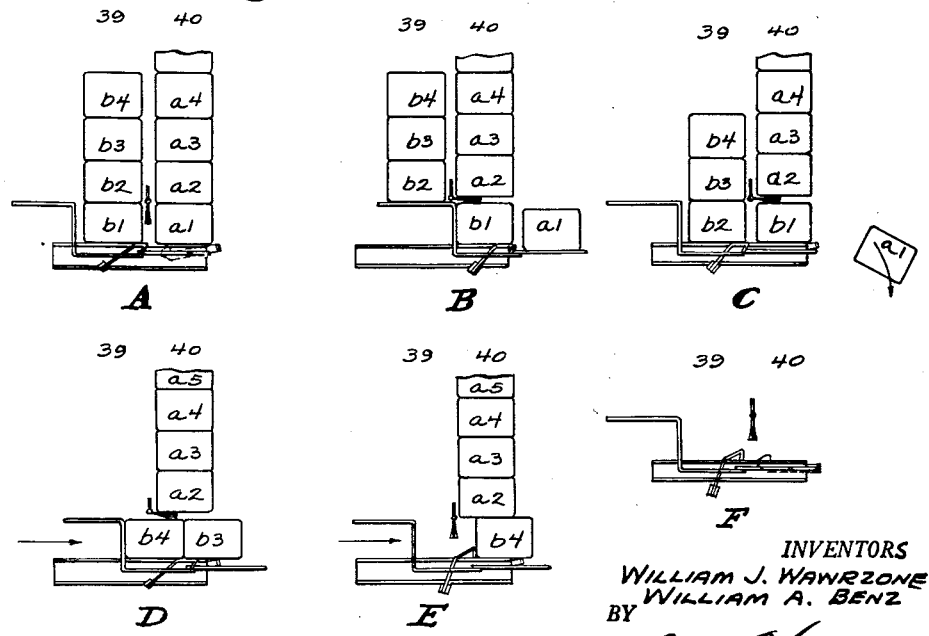
FIG. 12 includes diagrams A through F, illustrating the manner of operation of the dispensing mechanism.

Movement of the pull rod in either direction slides the pins 66 and 73 in their respective connector lever slots whereby the truck is moved toward the back of the cabinet along the track as the rod is pulled by a user, the connector lever pivoting on shaft 63. Thus when the rod is pulled, packages $a1$ and $b1$ on the truck lower floor 53 are moved from beneath the stacks in the several rack compartments as shown in FIG. 12A, to the positions shown in FIG. 12B. It will be seen that package $b1$ is substituted for package $a1$ while package $a1$ now rests on the truck bars 56. The stack of packages $b$ is now supported by the upper truck floor 54. Upon release of the pull rod, the spring 72 retracts the truck under packages $b2$, $b3$ and $b4$ leaving package $b1$ in the position shown in FIG. 12C. Package $b2$ now moves to the lower truck floor and package $a1$ is discharged for delivery to the user. On succeeding pulls on the rod, actions similar to that above take place until the last package $b4$ is reached in compartment 39 when the packages are in the position shown in FIG. 12D. Upon the next movement of the pull rod, package $b4$ is engaged by the package-pusher 61 as shown in FIG. 12E and is moved onto the bars 56 to allow package $a2$ to seat on the lower truck floor. Thereafter packages in compartment 40 continue to be discharged in sequence by action of the pusher 61 until such stack is also exhausted.

So long as a package remains on the truck lower level, the package rides on and over the lighter end of the latch 50 and holds the other latch end out of the path of movement of the truck. When the last package is discharged from a rack, the heavier end of the latch drops into the path of the truck as shown in FIG. 12F. Hence, it is impossible for a potential purchaser to lose the effect of his deposit of coins due to movement of an empty truck.

Each pull rod has a number of aligned projections or teeth 76 equally spaced along the rod in a particular relationship to the shaft 63 for severally presenting at least one vertical surface somewhat like a toothed rack. The teeth on each pull rod are engageable by various teeth of a latch member 77 somewhat like a gear segment. Each latch gear is fixed on the shaft 63 so that movement of one pull rod rotates each gear segment and the shaft. Rotation of the shaft however is prevented until released by the deposit of a particular coin or coins in payment of a package selected by a customer. The first one (in the direction in which the rod is pulled) of the rod teeth 76 is slotted and the gear 77 moves through the slot on counterclockwise rotation of the gear, until a flange on the gear engages the front of the teeth. Therefore, each rack and gear are definitely positioned upon each movement of a pull rod.

A box 79 is set into the insulation in cabinet wall section 29 and substantially incloses a coin selector-rejector 80 of known construction. Access to the coin selector-rejector without opening the entire cabinet is obtained by way of a cover 81. A slot is formed in the cover 81 and has a hood 82 to reduce entry of rain or snow therethrough. The slot is of a size for insertion only of coins below a given diameter and is joined by way of a chute 83 with the coin selector-rejector. The coin selector-rejector is set to accept certain coins and to discharge those coins into a receiver (not shown) while rejecting and returning any other coins (or slugs) capable of passing through the slot, to coin return tray 84. The chute 83 is twisted 90° or is otherwise so shaped and proportioned as to bring the coin to standstill just before dropping the same into the coin selector-rejection, the chute boss 90 finally locating each coin properly. Thus, the selector-rejector will not be affected by the manner in which the coins are deposited. In addition to being inclosed in the cabinet insulation, the coin selector-rejector has an electric heater 85 placed adjacent thereto or in contact therewith to keep the coin selector dry and free from frost. Deposit of the coin or coins for which the coin selector is set, releases its shaft 86 for a given amount of rotation before the shaft is re-latched. A sleeve about shaft 86 is surrounded by a heater 87 which aids heater 85 in keeping the coin mechanism dry and free from frost. (Similar heaters 87 are also placed about sleeves through which the pull rods move.)

Movement of the coin selector-rejector shaft 86 releases shaft 63 forming the pivot for the truck connectors 65 and the latch gears 77. The user can then pull on any selected pull rod for moving one package of food from the rack to the discharge point and receives such package when retraction of the truck by the spring discharges the package into the delivery chute. The coin selector shaft 86 is connected with the latch shaft 63 by a linkage which is rigid except for a universal joint or joints therein. The linkage may take the form of a crank 90 on shaft 63 and a crank 91 on shaft 86, which are joined by a rod 92 having clevis type universal connectors such as are well known. The rod preferably has right hand and left hand threads at the ends thereof for adjustment of the rod length. The linkage therefore accommodates for extension and movement of the shafts 63 and 86 in different directions and by different amounts as the shafts 63 and 86 oscillate through arcs of approximately 170°.

Rotation of the pivot shaft 63 releases all of the latch gears 77 from the latch teeth 76 of the pull rod associated therewith, upon every deposit of coins and means must therefore be provided for preventing movement of several trucks simultaneously and for a sufficient distance to permit discharge of a package from more than one rack. Such means include a tongue 93 extending from each pull rod in offset and parallel relation thereto, and a casing 94 of a size for retaining movable parts such as balls 95. Movement of the row of balls 92 is limited in all directions but the balls may move longitudinally of the casing by a distance equal to the diameter of one pull rod tongue 93. The casing extends along the whole of the dispensing mechanism at right angles to the pull rods 74 and their tongues 93 and has one pair of perforations for each dispensing sub-unit, which perforations are severally in alignment with the tongues. The tongue 93 of one of the rods, but only one, may pass through a pair of perforations in the casing and between the balls because the clearance between the casing 94 and the balls 95 is taken up by passage of one tongue therethrough, blocking all other tongues as indicated in FIG. 9. Hence, it is possible only to move one pull rod and one truck sufficiently to bring a package to the discharge point while all other trucks are blocked against movement in the discharge direction.

As soon as a pull rod has moved far enough for the latch gear 77 to engage the pull rod teeth 76, such engagement blocks the coin selector-rejector and requires that the selected rod be pulled to full stroke. The user must therefore make certain that the proper rod is being pulled and suitable means are provided to mark the several pull rods whereby an accurate selection may be made with ordinary care.

When a pull rod 71 is released by the user, it is retracted by its spring 72 and such retraction rotates the shaft 63 counter-clockwise through the actions of the pull rod teeth 76 on the latch gear 77, whereby the truck is returned to its original position. The latch gears now severally re-engage the pull rod teeth of their associated rods and the entire mechanism is locked until deposit of additional coins again trips the coin selector-rejector and releases the latch shaft 63.

It will thus be seen that the present construction provides a heat-insulated cabinet with a space to be refrigerated and accessible by way of a heat-insulated door forming a substantial portion of the front wall of the cabinet. The door is hinged along its lower edge by readily detachable hinges for swinging outwardly to carry coin-controlled dispensing means on the door into easily accessible position for receiving packages of food to be dispensed. The function of the door in carrying the dispensing mechanism may be performed by a frame pivoted in the cabinet to swing through the door opening. The dispensing mechanism is in multiple dependent on the shape and size of packages, etc., each sub-unit including a rack which has multiple tubular compartments open at the top and bottom for severally receiving stacks of the packages, the compartments being aligned from the front to the rear of the cabinet space to discharge the packages by gravity along a given path. A number of multiple compartment units are arranged in side-by-side relation for receiving different varieties of a similarly packaged food. Means operable from exteriorly of the cabinet are provided for successively conveying packages from the compartments of each rack to a location for discharge of the package to a discharge tray. The conveying means comprises a sub-assembly for each rack and includes a track below the rack with a truck thereon for receiving packages and discharging one package upon each movement of the truck in a given direction. The truck is moved in one direction by a pull rod accessible from exteriorly of the cabinet and is retracted automatically upon release of the pull rod, discharge of the package occurring on such retraction. The track has top and bottom flanges on each side to retain the truck in substantially a given path, and is at least partially closed at the ends to stop truck movement in either direction in given positions.

Each rack includes a separator to aid in supporting a stack of packages in one compartment while the packages pass beneath the holder from another compartment of the same rack. Each truck has a pawl-like pusher for engaging the packages from the second or succeeding compartment after the first compartment is emptied. And each track has a lever held in one position by a package on the truck and swinging into the path of the truck or engaging its pull rod when an entire rack is empty to stop any material movement of the truck by the pull rod.

It is, of course, possible to use racks with more than two compartments by increasing the number of truck levels and providing a package pusher for each truck floor excepting the highest one. Stack-separators are then provided between each adjacent pair of rack compartments. However, the dispensing mechanism then becomes quite complicated and the trucks become heavier and harder to move.

It is desirable that means be provided for delivering all coins to the selector-rejector under the effect of gravity only from a given position. Such means may take the form of a chute changing the direction of the coin movement after the coin leaves the slot, or of chute shaping to check or stop movement of all the coins along the chute in a given position. The coin selector-rejector mechanism releases the interlock for all of the dispensing units for selective operation of one of the trucks. The accepted coins are immediately delivered to a coin receiver but dispensing of more than one package is prevented by a latch holding all but one truck against movement. After all the packaged food in a dispensing unit is withdrawn, further release of the pull rod latch by the coin mechanism and attempted operation of the truck of such unit merely results in jarring the coin selector sufficiently for return of the deposited coins to the intended purchaser.

When any rod is pulled beyond a relatively small amount, all other rods are locked and it is impossible to return the selected pull rod to its original position for a different selection. Hence, users cannot interrupt operation of the dispensing mechanism at an intermediate point and jam the mechanism by a partially discharged package.

It will be understood that the present machine is applicable to vending of any refrigerated food, whether required to be frozen or not. In some cases, the machine is usable in its present form and in other cases adaptations will be made for different shapes and sizes of package.

Although but one embodiment of the present invention has been illustrated and described, it will be apparent to those skilled in the art that various changes and modifications may be made therein without departing from the spirit of the invention or from the scope of the appended claims.

We claim:

1. In a mechanism for dispensing packages from a vending cabinet upon deposit of certain predetermined coins, a plurality of tracks mounted in said cabinet, package storage racks mounted over and adjacent one end of each of said tracks, a package dispensing truck mounted for reciprocable movement on each of said tracks to receive packages from said racks for dispensing thereof, a pull rod operator for each of said trucks for effecting dispensing movement of said trucks, linkage means connecting said pull rod operators to said trucks, an operating shaft journalled for rotation in said cabinet, a plurality of gear segments fixedly secured on said operating shaft for rotation therewith, a flange formed on the first tooth of each of said gear segments and extending transversely therefrom, each of said gear segments being disposed adjacent one of said pull rod operators, a plurality of teeth formed on and extending outwardly from the surface of each of said pull rod operators for engagement with a respective one of said gear segments, said flange members on said first tooth of each of said gear segments being normally disposed in abutting engagement with the first one of said teeth on a respective one of said pull rod operators, said first one of said teeth on each of said pull rod operators being slotted to pass said teeth of said gear segments therethrough when said gear segment is rotated by said shaft, whereby movement of one of said pull rods will initiate rotation of said segment through engagement of its said slotted tooth with the flange on the corresponding gear segment, the remaining gear segments, passing freely through the remaining slotted teeth, means preventing operation of more than one pull rod at a time, a coin selector-rejector mounted on said cabinet, and linkage means connecting said coin selector-rejector to said operating shaft whereby when the necessary coins are deposited in said selector-rejector unlocking of said shaft may be effected to permit operation of a selected one of said pull rod operators.

2. In a mechanism for dispensing packages from a vending cabinet upon deposit of certain predetermined coins, package storage racks mounted within the cabinet, a package dispensing ejector mounted for reciprocable movement within said cabinet to dispense packages from said racks, a pull rod operator for each of said ejectors for effecting dispensing movement of said ejectors, linkage means connecting said pull rod operators to said ejectors, an operating shaft journalled for rotation in said cabinet, a plurality of gear segments fixedly secured on said operating shaft for rotation therewith, a flange formed on the first tooth of each of said gear segments and extending transversely therefrom, each of said gear segments being disposed adjacent one of said pull rod operators, a plurality of teeth formed on and extending outwardly from the surface of each of said pull rod operators for engagement with a respective one of said gear segments, said flange members on said first tooth of each of said gear segments being normally disposed in abutting engagement with the first one of said teeth on a respective one of said pull rod operators, said first one of said teeth on each of said pull rod operators being slotted to pass said teeth of said gear segments therethrough when said gear segment is rotated by said shaft, whereby movement of one of said pull rods will initiate rotation of said segment through engagement of its said slotted tooth with the flange on the corresponding gear segment, the remaining gear segments passing freely through the remaining slotted teeth, means preventing operation of more than one pull rod at a time, a coin selector-rejector mounted on said cabinet, and linkage means connecting said coin selector rejector to said operating shaft whereby when the necessary coins are deposited in said selector-rejector unlocking of said shaft may be effected to permit operation of a selected one of said pull rod operators.

3. In a mechanism for dispensing packages from a vending cabinet upon deposit of certain predetermined coins, a plurality of tracks mounted in said cabinet, package storage racks mounted over and adjacent one end of each of said tracks, a package dispensing truck mounted for reciprocable movement on each of said tracks to receive packages from said racks for dispensing thereof, a pull rod operator for each of said trucks for effecting dispensing movement of said trucks, linkage means connecting said pull rod operators to said trucks, an operating shaft journalled for rotation in said cabinet, a plurality of gear segments fixedly secured on said operating shaft for rotation therewith, a flange formed on the first tooth of each of said gear segments and extending transversely therefrom, each of said gear segments being disposed adjacent one of said pull rod operators, a plurality of teeth formed on and extending outwardly from the surface of each of said pull rod operators for engagement with a respective one of said gear segments, said flange members on said first tooth of each of said gear segments being normally disposed in abutting engagement with the first one of said teeth on a respective one of said pull rod operators, said first one of said teeth on each of said pull rod operators being slotted to pass said teeth of said gear segments therethrough, whereby movement of one of said pull rods will initiate rotation of the corresponding one of said gear segments through engagement of its said slotted tooth with said flange of said first tooth of said gear segment and rotating said shaft, the remaining gear segments being rotated by said shaft and passing freely through the remaining slotted teeth, tongue members fixedly secured to said pull rod operators, an elongated casing mounted within said cabinet, said casing having a plurality of movable members therein, said movable members being capable of longitudinal movement in said casing in an amount equal to the diameter of one of said tongue members whereby when one of said pull rod operators is actuated said tongue member carried by said pull rod operator will enter between said movable members to cause said members to be jammed together to prevent any other tongue member from entering the casing and thereby preventing dispensing movement of any of said other pull rod operators, a coin selector-rejector mounted on said cabinet and linkage means connecting said coin selector-rejector to said operating shaft whereby when the necessary coins are deposited in said selector-rejector unlocking of said shaft may be effected to permit operation of a selected one of said pull rod operators.

References Cited in the file of this patent
UNITED STATES PATENTS

| | | |
|---|---|---|
| 804,013 | Klein | Nov. 7, 1905 |
| 874,236 | Pond | Dec. 17, 1907 |
| 1,167,214 | Petersen | Jan. 4, 1916 |
| 1,420,834 | Giles | June 27, 1922 |
| 1,851,557 | Wurzbach | Mar. 29, 1932 |
| 1,912,999 | Richardson | June 6, 1933 |
| 1,981,467 | Radtke | Nov. 20, 1934 |
| 2,008,926 | Rowe | July 23, 1935 |
| 2,156,531 | Geer | May 2, 1939 |
| 2,227,477 | Williamson | Jan. 7, 1941 |
| 2,247,575 | De Stefani | July 1, 1941 |
| 2,314,632 | Rear | Mar. 23, 1943 |
| 2,380,093 | Wilder | July 10, 1945 |
| 2,426,707 | Polsen | Sept. 2, 1947 |
| 2,521,458 | Huheey | Sept. 5, 1950 |
| 2,616,573 | Grady | Nov. 4, 1952 |
| 2,635,938 | Whitney | Apr. 21, 1953 |
| 2,675,901 | Childers | Apr. 20, 1954 |
| 2,776,035 | Hebel | Jan. 1, 1957 |
| 2,822,074 | Childers | Feb. 4, 1958 |